United States Patent [19]
Niedospial

[11] Patent Number: 5,251,840
[45] Date of Patent: Oct. 12, 1993

[54] FILM CASSETTE WITH NON-PROTRUDING FILM LEADER

[75] Inventor: John J. Niedospial, New York, N.Y.

[73] Assignee: Eastman Kodak Company, Rochester, N.Y.

[21] Appl. No.: 888,078

[22] Filed: May 26, 1992

[51] Int. Cl.$^5$ ............................................. G03B 17/26
[52] U.S. Cl. ..................................... 242/71.1; 354/275
[58] Field of Search ............................. 242/71.1, 71.7; 354/275; 206/397, 407, 409

[56] References Cited

U.S. PATENT DOCUMENTS

| | | | |
|---|---|---|---|
| 4,887,112 | 12/1989 | Niedospial, Jr. et al. | 354/275 |
| 5,046,681 | 9/1991 | Niedospial | 242/71.1 |
| 5,046,682 | 9/1991 | Niedospial | 242/71.1 |
| 5,178,340 | 1/1993 | Niedospial | 242/71.1 |

Primary Examiner—John M. Jillions
Attorney, Agent, or Firm—Roger A. Fields

[57] ABSTRACT

In a film cassette, a spool is supported for rotation in an unwinding direction inside a cassette shell, a filmstrip is coiled about the spool to form a roll with an outermost film convolution that is a nonprotruding leader, and a stripper is located substantially adjacent a passageway to the exterior of the shell for receipt between a leading edge of the leader and a next-inward film convolution of the roll to divert the leading edge into the passageway when the spool is rotated in the unwinding direction. According to the invention, the leading edge of the leader is inclined at one angle rearwardly from its center point on a longitudinal centerline of the filmstrip towards one longitudinal edge of the filmstrip relatively remote from the stripper and is inclined at another angle forwardly from the centerpoint towards another longitudinal edge of the filmstrip relatively close to the stripper. This arrangement facilitates advancement of the leading edge into and through the passageway.

4 Claims, 12 Drawing Sheets

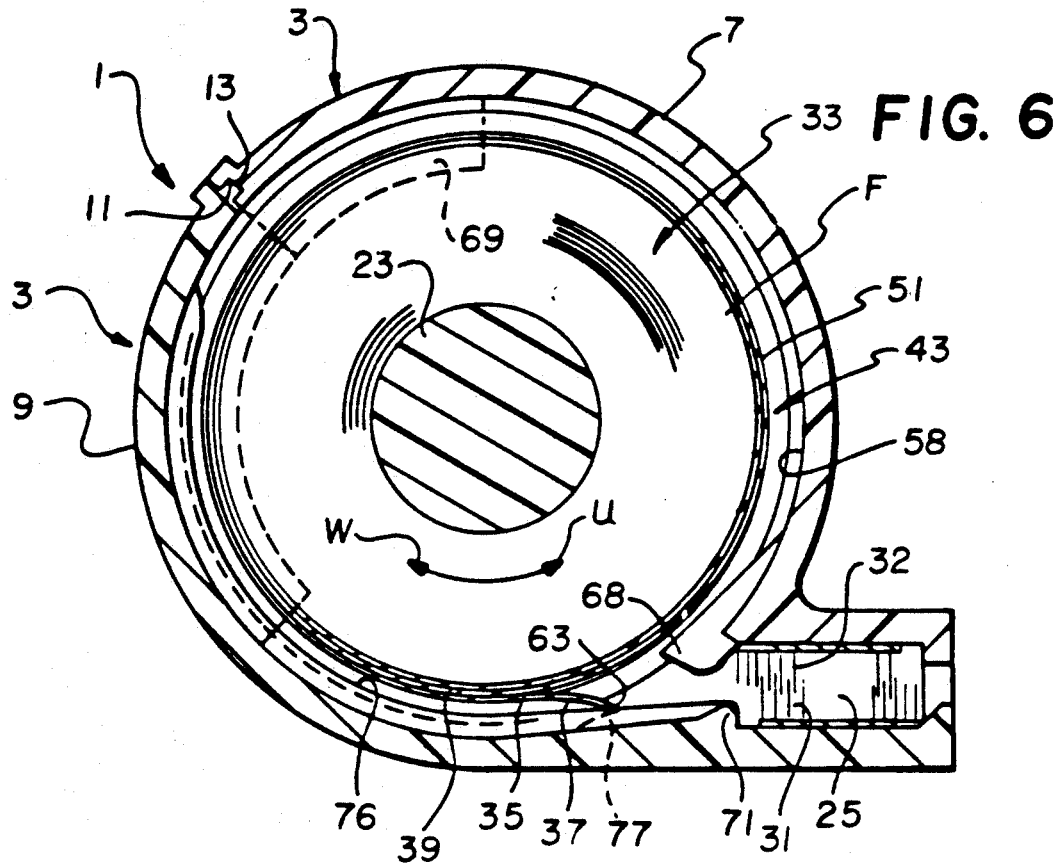
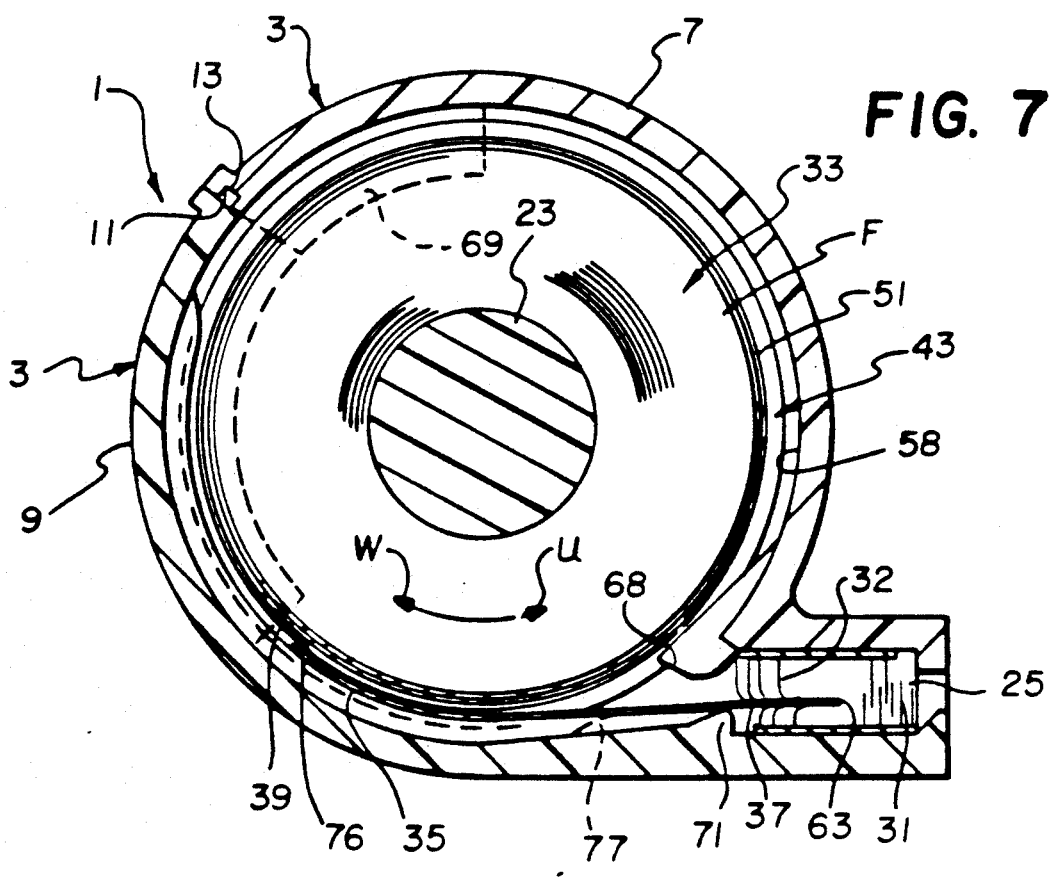

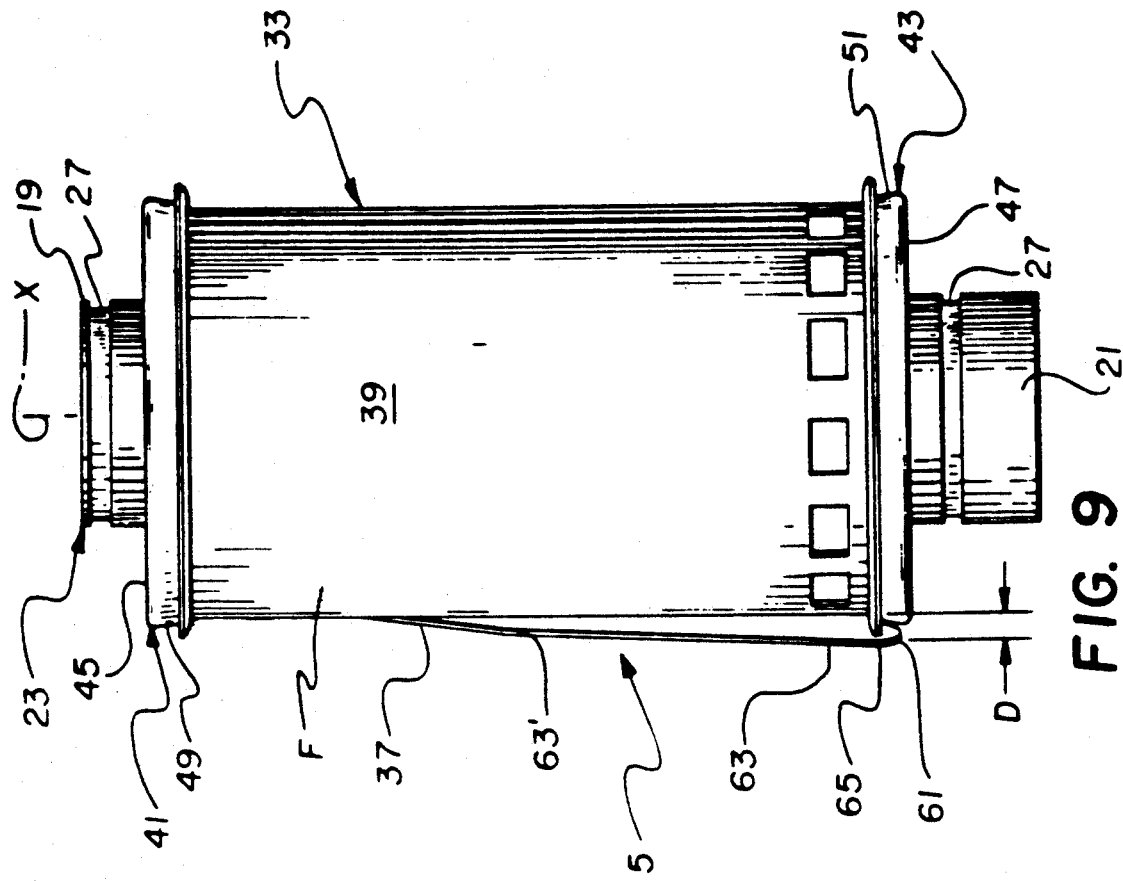

FILM CASSETTE WITH NON-PROTRUDING FILM LEADER

BACKGROUND OF THE INVENTION

1. Field of the Invention

The invention relates generally to the field of photography, and in particular to a film cassette containing roll film. More specifically, the invention relates to a film cassette that is capable of automatically advancing a non-protruding film leader out of the cassette shell responsive to unwinding rotation of a film spool inside the shell.

2. Description of the Prior Art

A 35mm film cassette has been proposed which, unlike conventional film cassettes, can be operated to automatically advance a film leader out of the cassette shell simply by rotating the film spool in the unwinding direction. The film leader originally is located entirely inside the cassette shell. Specifically, in commonly assigned U.S. Pat. No. 5,046,682, granted Sep. 10, 1991, there is disclosed a film cassette wherein a spool is supported for rotation in an unwinding direction inside a cassette shell, a filmstrip is coiled about the spool to form a film roll with an outermost convolution that is a non-protruding leader, a pair of flanges are coaxially arranged along the spool to radially confine the film roll to keep the roll captive, and a film stripper is located substantially adjacent a passageway to the exterior of the shell to be received between an inclined leading edge of the leader and a next-inward convolution of the film roll to divert the leading edge into the passageway when the spool is rotated in the unwinding direction. Once the inclined leading edge is substantially advanced into the passageway, the transverse stiffness of the filmstrip serves to flex the flanges away from each other to permit the filmstrip to escape the confinement of the flanges.

If the film roll has been stored on the spool for an unduly long time, it may develop what is commonly referred to as a "core set". The core set, in essence, manifests itself as a lack of resistance of the film roll to being curled inward about the spool. Consequently, when the spool is rotated in the unwinding direction to move the inclined leading edge of the leader over the stripper, a certain portion of the leading edge not yet advanced over the stripper may sag into a space between the outermost convolution of the film roll and the entrance to the passageway. Since the leader has a core set, it might remain in the space and cause a film jam inside the cassette shell.

SUMMARY OF THE INVENTION

In a film cassette, a spool is supported for rotation in an unwinding direction inside a cassette shell, a filmstrip is coiled about the spool to form a roll with an outermost film convolution that is a nonprotruding leader, and a stripper is located substantially adjacent a passageway to the exterior of the shell for receipt between a leading edge of the leader and a next-inward film convolution of the roll to divert the leading edge into the passageway when the spool is rotated in the unwinding direction. According to the invention, the leading edge of the leader is inclined at one angle rearwardly from its center point on a longitudinal centerline of the filmstrip towards one longitudinal edge of the filmstrip relatively remote from the stripper and is inclined at another angle forwardly from the centerpoint towards another longitudinal edge of the filmstrip relatively close to the stripper to facilitate movement of the leading edge into the passageway. The dual angle design of the leading edge of the leader has been found to negate the chance of the leading edge sagging into the space between the outermost film convolution and the entrance to the passageway as in U.S. Pat. No. 5,046,682.

BRIEF DESCRIPTION OF THE DRAWINGS

FIGS. 5, 6, and 7 are end views similar to FIG. 4, illustrating the manner in which the film roll is unwound from the film spool;

FIGS. 8 and 9 are elevation views of the film roll and the film spool, illustrating the manner in which the film roll is originally stored on the film spool;

DETAILED DESCRIPTION OF THE PREFERRED EMBODIMENT

The invention is disclosed as being embodied preferably in a 35mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
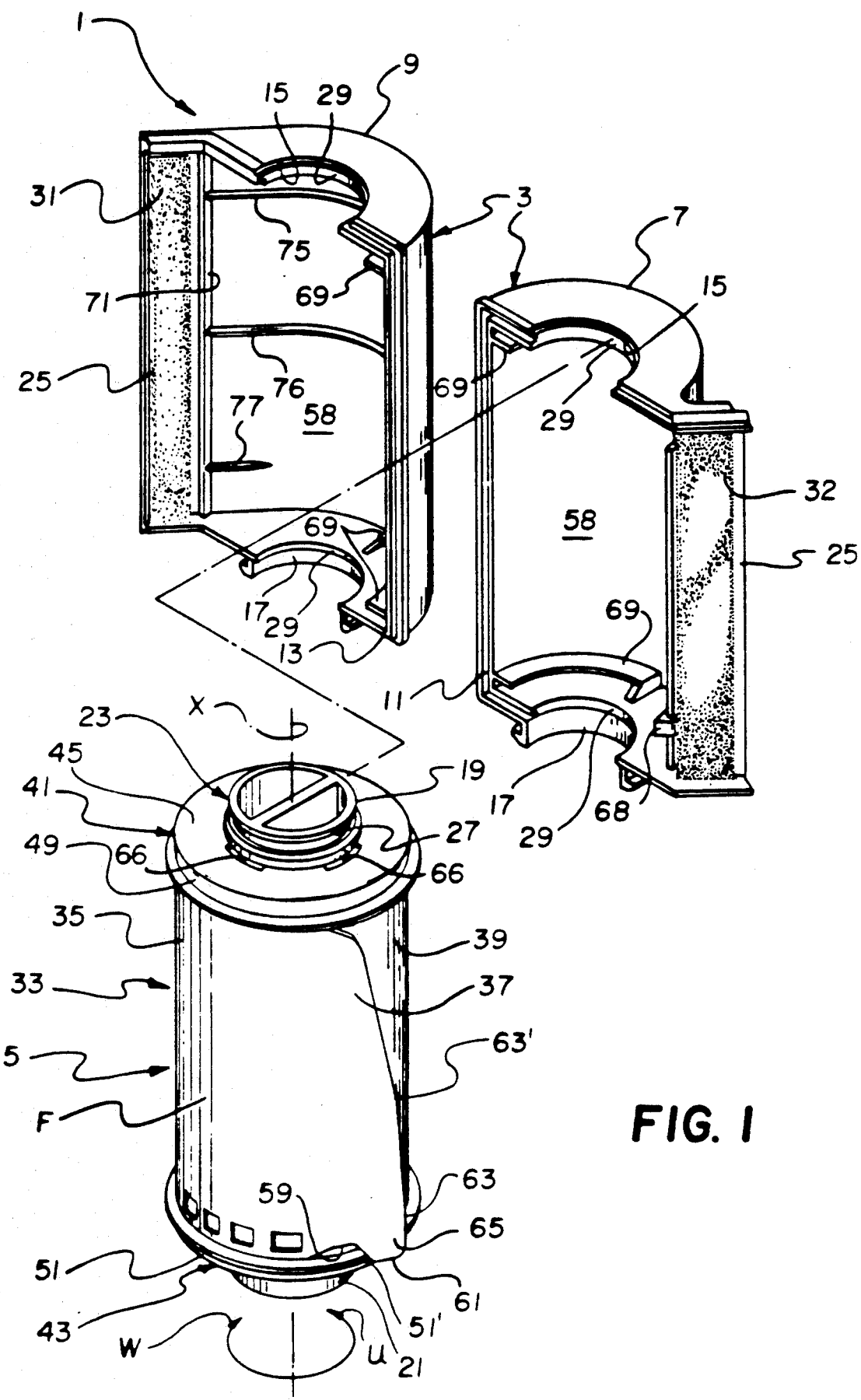
FIG. 1 is an exploded perspective view of a film cassette according to a preferred embodiment of the invention.
Figure 2:
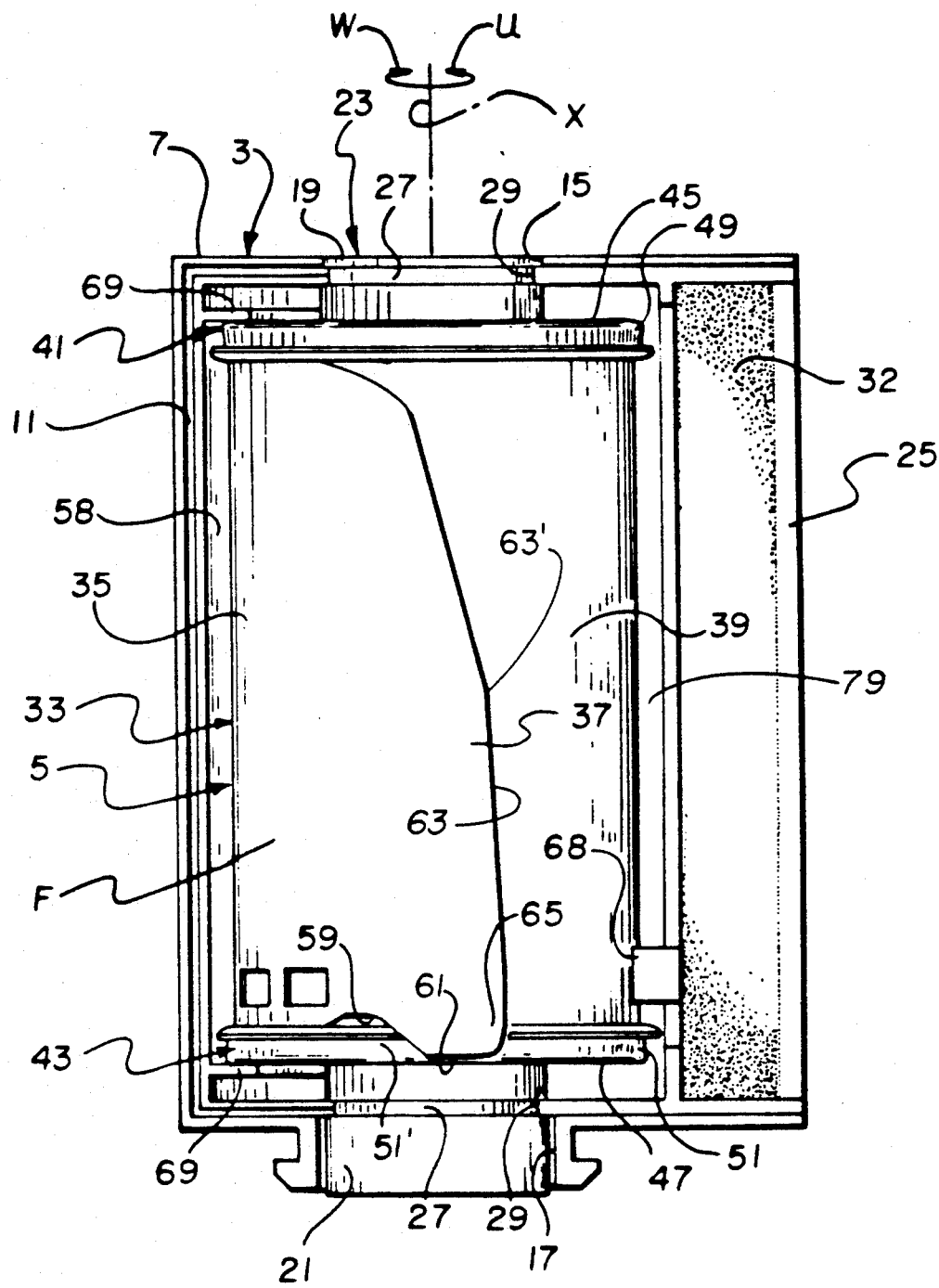
FIG. 2 is an elevation view of the film cassette, illustrating the cassette shell open to reveal a film roll coiled about a film spool.
Figure 4:
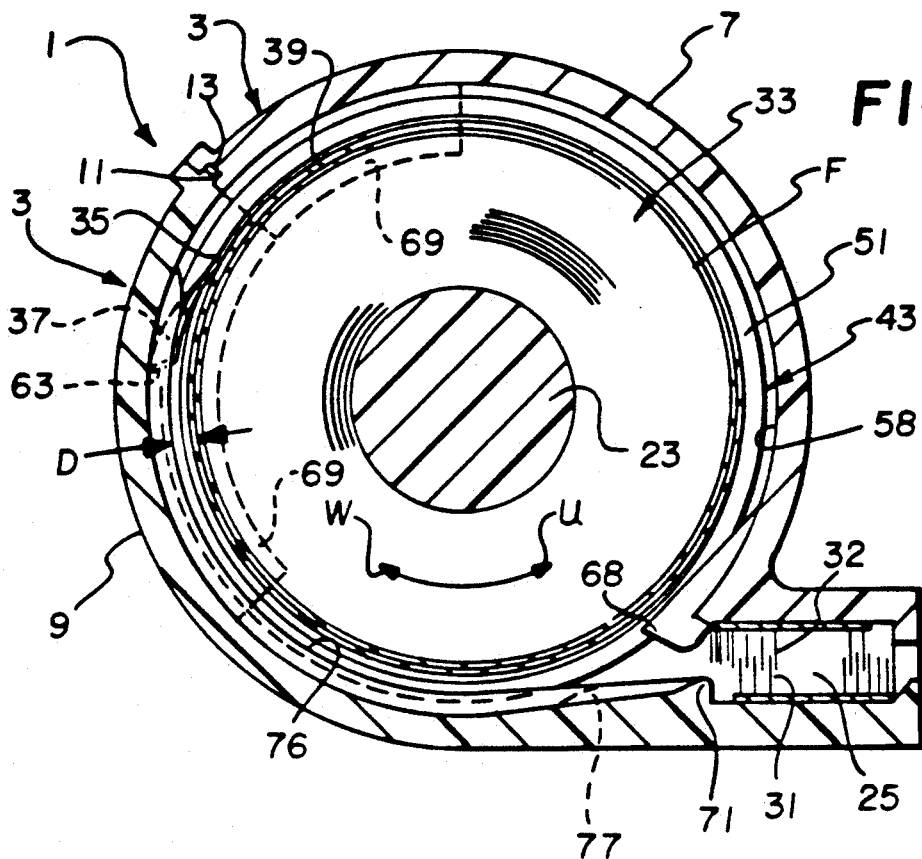
FIG. 4 is an end view partly in section of the cassette shell, the film roll and the film spool, illustrating the manner in which the film roll is originally stored on the film spool.
Figure 5:
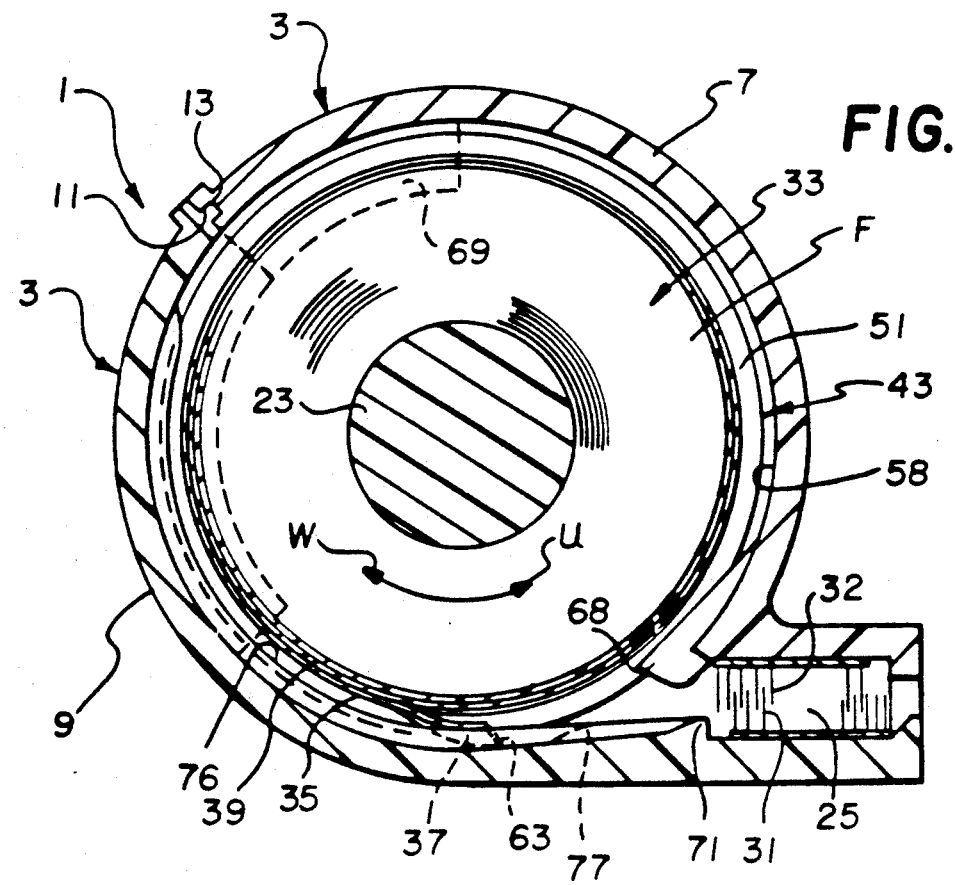
Figure 12:
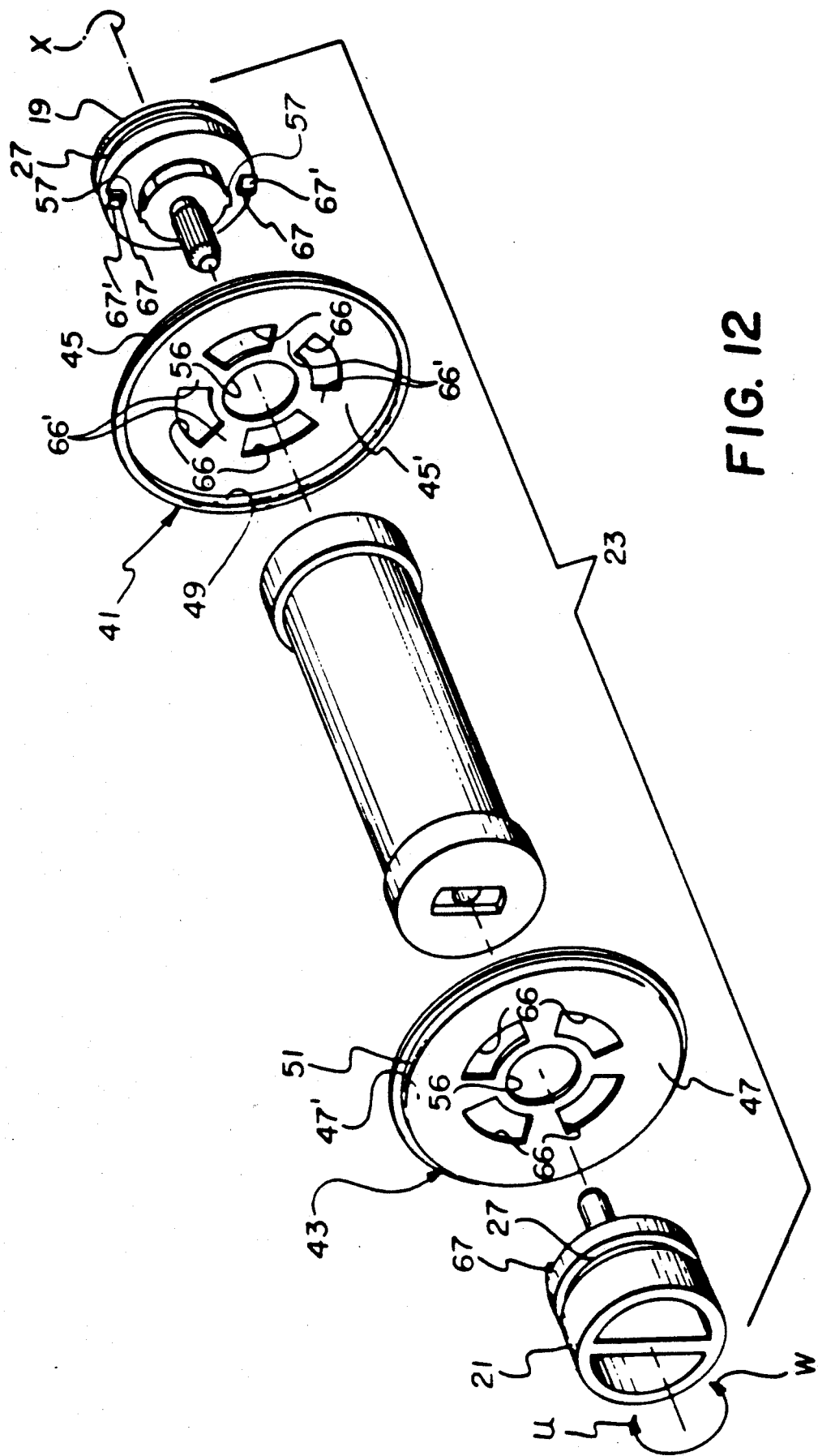
FIG. 12 is an exploded perspective view of the film spool without the film roll.

Referring now to the drawings, FIGS. 1, 2 and 12 depict an improved 35mm film cassette 1 comprising a light-tight cassette shell 3 and a film spool 5 which is rotatable about an axis X in film unwinding and winding directions U and W within the cassette shell. The cassette shell 3 consists of two shell halves 7 and 9 which are mated along respective grooved and stepped edge portions 11 and 13. The mated halves 7 and 9 define upper and lower aligned circular openings 15 and 17 for relatively shorter and longer opposite open-end pieces 19 and 21 of a spool core or hub 23, and they define a narrow relatively-straight film passageway 25 to the exterior of the cassette shell 3. The longer and shorter open-end pieces 19 and 21 of the spool core 23 each include an annular peripheral groove 27 which mates with a corresponding edge portion 29 of the respective openings 15 and 17 in the cassette shell 3 to rotatably support the film spool 5 for rotation about the axis X in the film unwinding and winding directions U and W. A pair of black velvet or plush pads 31 and 32 are secured at the interior of the film passageway 25 to the shell halves to prevent ambient light from entering the film passageway. As can be seen in FIG. 4, the two plush pads 31 and 32 are staggered relative to each other to extend the pad 32 further inward inside the cassette shell 3 than the pad 31.

Figure 3:
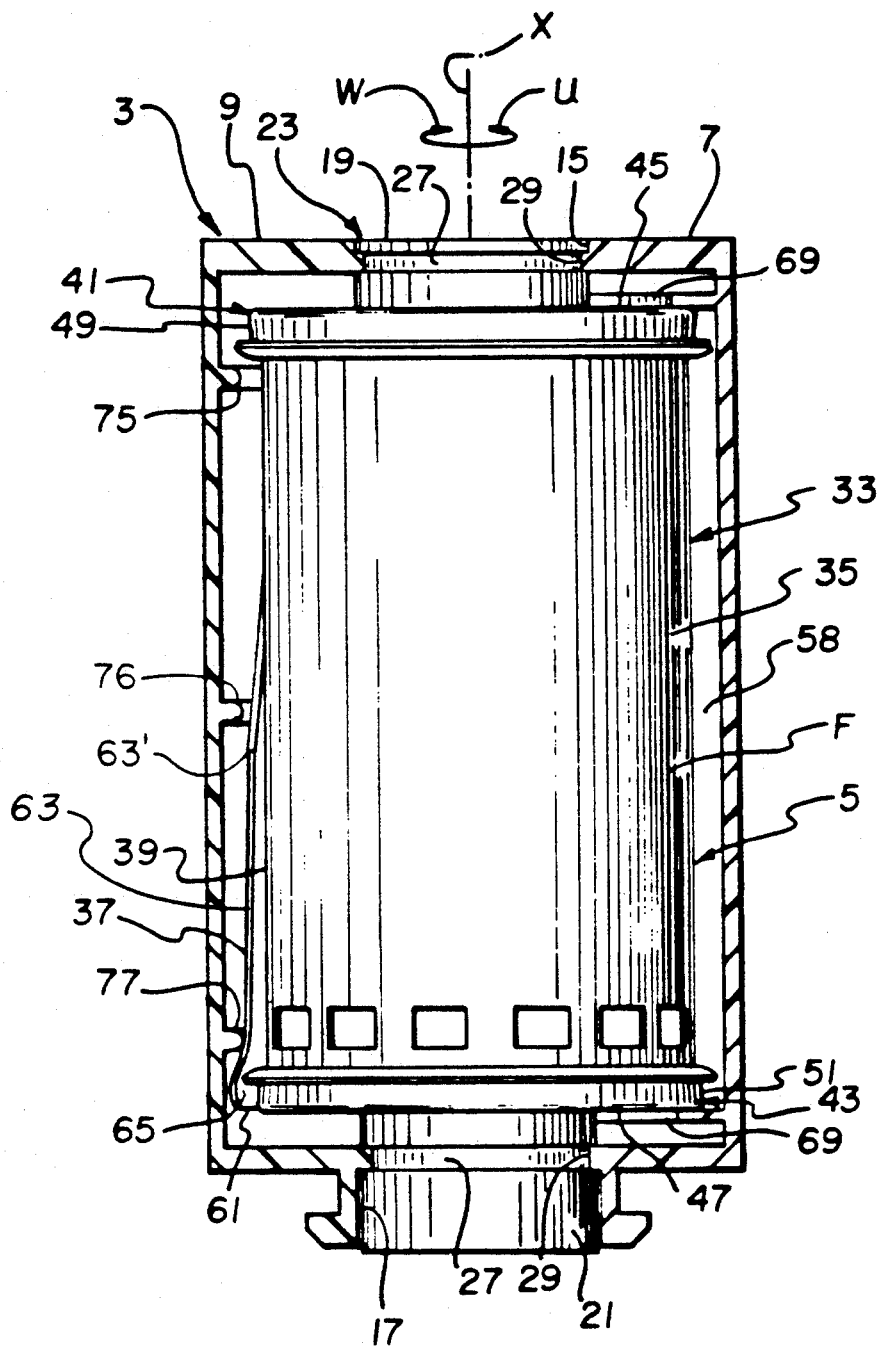
FIG. 3 is an elevation view similar to FIG. 2, through in section.
Figure 13:
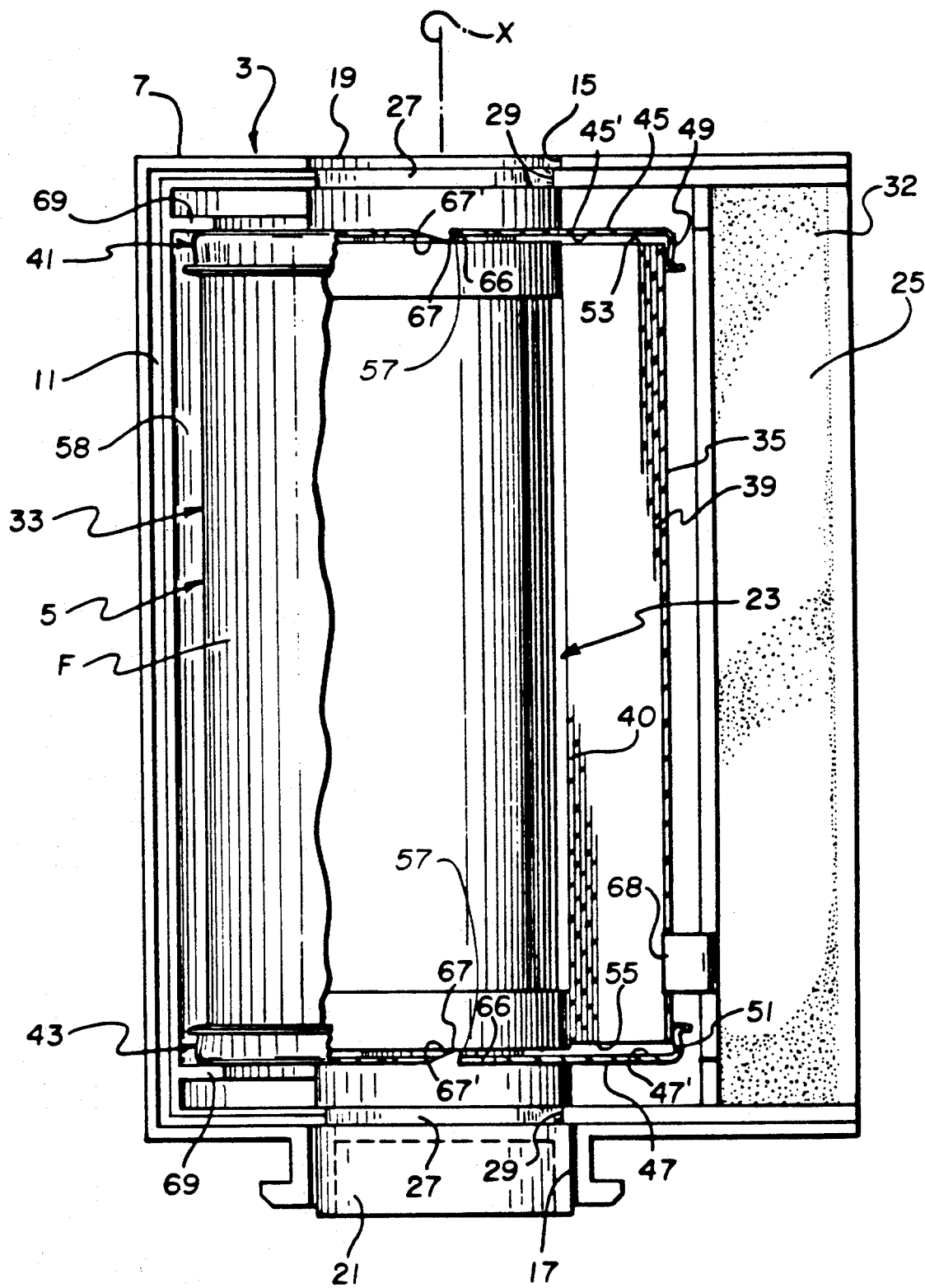
FIG. 13 is an elevation view partly in section of the film roll and the film spool, illustrating the manner in which a pair of film confining flanges of the spool may be fixed via respective engagement hooks to the spool for concurrent rotation with the spool.

A roll 33 of 35mm filmstrip F is coiled about the spool core 23 to form successive film convolutions. As shown in FIG. 3, the film roll 33 includes an outermost convolution which comprises a film leader 35 having a leading or forward end 37, and it includes a next-inward convolution 39 coiled behind the outermost convolution. The inner or trailing end of an innermost convolution 40 of the film roll 33 is secured to the spool core 23 using known attachment means, not shown. See FIG. 13.

Figure 11:
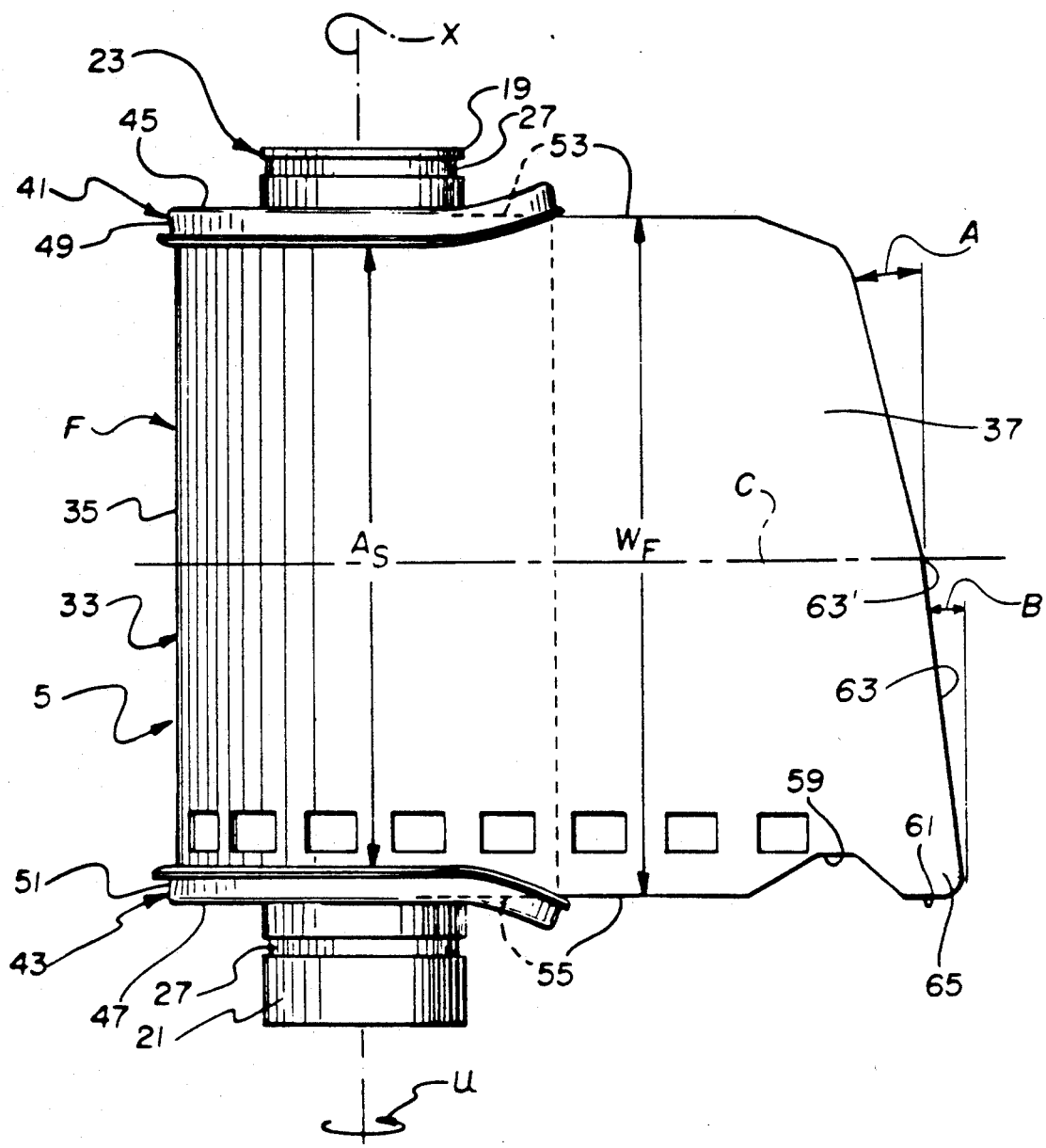
Figure 14:
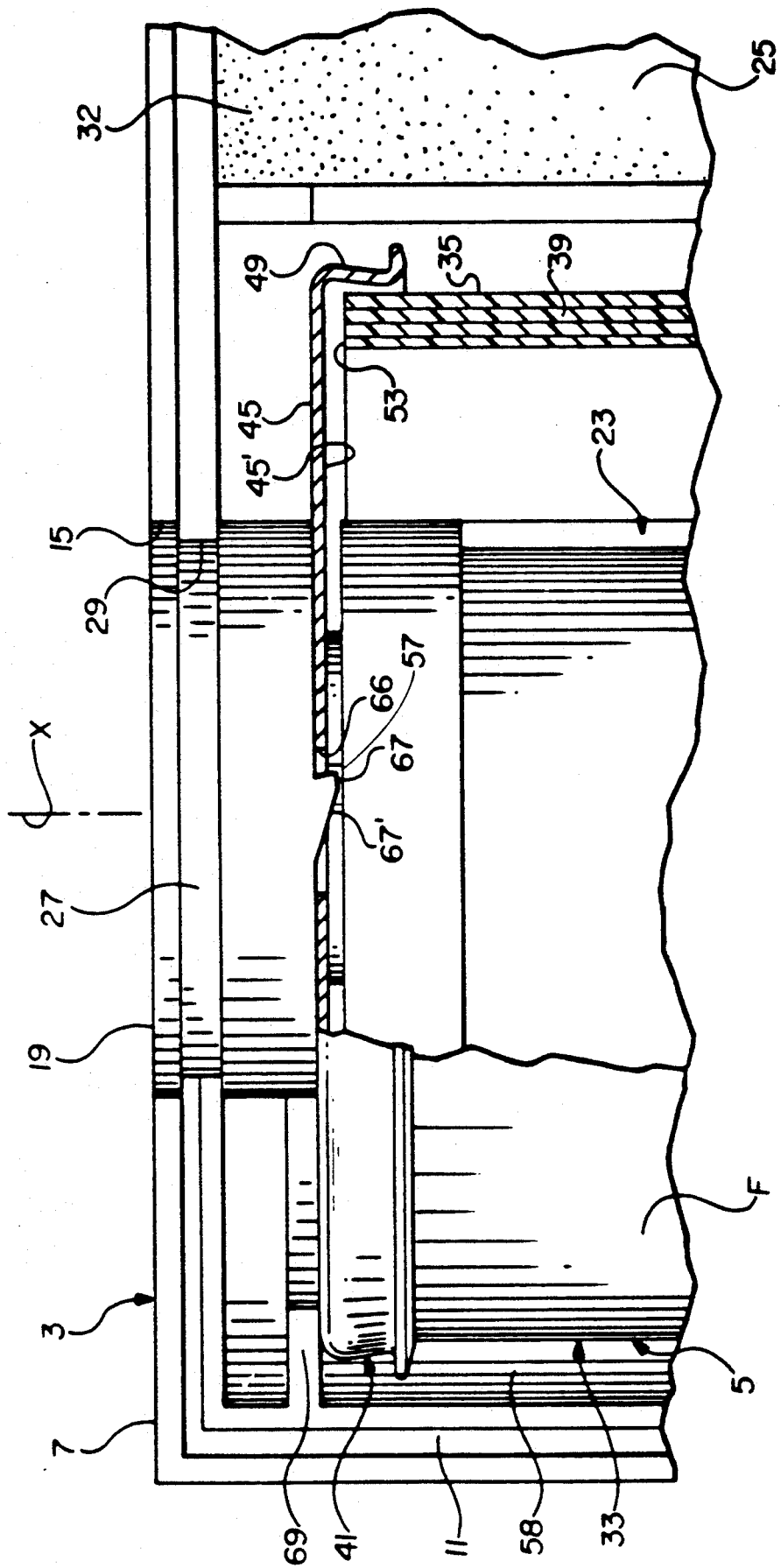
FIG. 14 is a blow-up of a particular portion of FIG. 13, illustrating one of the engagement hooks engaging one of the film confining flanges.
Figure 15:
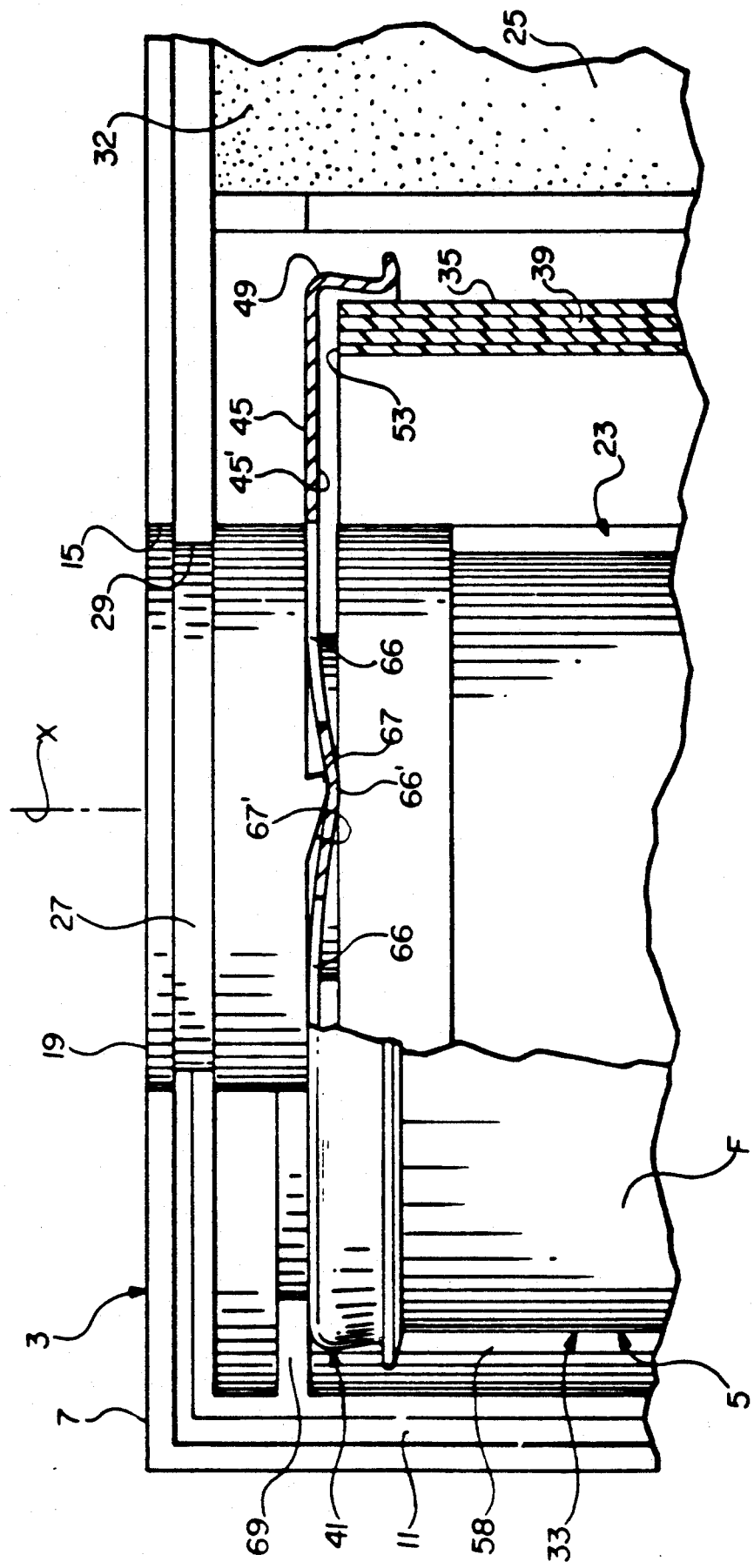
FIG. 15 is a blow-up similar to FIG. 14, illustrating the engagement hook not engaging the film confining flange.

A pair of upper and lower identical, very thin, flexible film constraining flanges 41 and 43 are coaxially spaced along the spool core 23 as shown in FIGS. 1, 2, 8, 12 and 13. The two flanges 41 and 43 comprise respective integral disks 45 and 47 and respective integral annular lips or skirts 49 and 51 which circumferentially extend from the disks. The two disks 45 and 47 cover opposite substantially flat sides of the film roll 33 which are defined by corresponding opposite longitudinal edges 53 and 55 of each successive convolution of the film roll, and they have respective central holes 56 through which the spool core 23 coaxially extends to permit rotation of the spool core relative to the flanges 41 and 43. Respective pairs of identical supports 57, 57 and 57, 57 are fixed to the spool core 23 to support the flanges 41 and 43 at their disks 45 and 47. See FIGS. 12-14. The two pairs of supports 57, 57 and 57, 57 are sufficiently spaced from one another along the spool core 23 to maintain respective inner faces 45' and 47' of the disks 45 and 47 spaced from the longitudinal edges 53 and 55 of each successive convolution of the film roll 33. See FIG. 13. The annular lips 49 and 51 overlap the film leader (outermost convolution) 35 of the film roll 33 radially outwardly of the longitudinal edges 53 and 55 of the leader to radially confine the leader to thus prevent it from radially expanding or clock-springing into substantial contact with an interior curved wall 58 of the cassette shell 3. A lip-receiving notch 59 is cut in the film leader (outermost convolution) 35 along its longitudinal edge 55, relatively close to its leading end 37, to receive a peripheral section 51' of the annular lip 51. This allows a relatively short edge-section 61 of the film leader (outermost convolution) 35 connecting the leading end 37 and the notch 59 to overlap the annular lip 51 radially outwardly to thus maintain the leading end spaced a radial distance D from the next-inward convolution 39 of the film roll 33. See FIGS. 4 and 9. The leading end 37 has a forward or leading edge 63 interconnecting the longitudinal edge 53 of the film leader (outermost convolution) 3 and the longitudinal edge 55 of the leader. A forward-most tip or tab 65 of the film leader 35, like the edge-section 61 of the leader, overlaps the annular lip 51 radially outwardly. See FIGS. 1, 2, 8 and 9. The leading edge 63, as shown in FIG. 11, is inclined rearwardly from a centerpoint 63' at a longitudinal centerline C of the filmstrip F towards the longitudinal edge 53 at an acute angle A and is inclined forwardly from the centerpoint towards the longitudinal edge 55 at an acute angle B. Preferably, the angle A is 15 degrees and the angle B is 7 degrees.

The two flanges 41 and 43 have a plurality of concentric arcuate slots 66 cut in their respective disks 45 and 47 to longitudinally extend in the film unwinding and film winding directions U and W. Engagement means in the form of respective hook-like members 67, located on the short and longer open-end pieces 19 and 21 of the spool core 23, are normally located in the concentric slots 66 for movement along the slots into engagement with the flanges 41 and 43 responsive to rotation of the spool core relative to the flanges in the unwinding direction U and for movement along the slots out of engagement with the flanges responsive to rotation of the spool core relative to the flanges in the winding direction W. See FIGS. 12-15. Preferably, each of the hook-like members 67 has an end face 67' that is beveled to ease the hook-like member out of one of the concentric slots 66 responsive to rotation of the spool core 23 relative to the flanges 41 and 43 in the winding direction W, in the possible event the spool core is rotated relative to the flanges far enough in the winding direction to back the hook-like member out of the slot.

The two pairs of supports 57, 57 and 57, 57 are positioned to distort the flanges 41 and 43 at their disks 45 and 47 when the hook-like members 67 are not in the slots 66. See FIG. 15. More specifically, in this instance, the two pairs of supports 57, 57 and 57, 57 distort the flanges 45 and 47 in a manner such that respective flat areas 66' of the disks located between the slots 66 are urged firmly against the hook-like members 67. This will ensure that the hook-like members 67 are received in the slots 66 when the spool core 23 is rotated relative to the flanges 45 and 47 in the unwinding direction W, and thus will engage the flanges. See FIG. 14.

A film stripper-guide 68 projects from the interior wall 58 of the cassette half 7 toward the film roll 33. The stripper-guide 68 is positioned immediately inward of the inner entrance to the film passageway 25 to be received between the leading edge 63 of the film leader (outermost convolution) 35 and the next-inward convolution 39, close to the forward-most tip 65 of the leader, to pick up the leading edge and guide it into the film passageway responsive to rotation of the spool core 23 in the unwinding direction U. See FIGS. 1 and 4-7. The leading edge 63 will be advanced over the stripper-guide 68 and into the film passageway 25, rather than between the stripper-guide and the next-inward convolution 39, because it is spaced the radial distance D from the latter convolution. Thus, as shown in FIG. 4, the leading edge 63 will be located within range of the stripper-guide 68 due to such spacing D from the next-inward convolution 39. The dual angle design of the leading edge 63 has been found to negate the chance of the leading edge sagging into the space 79 shown in FIG. 2.

Figure 10:
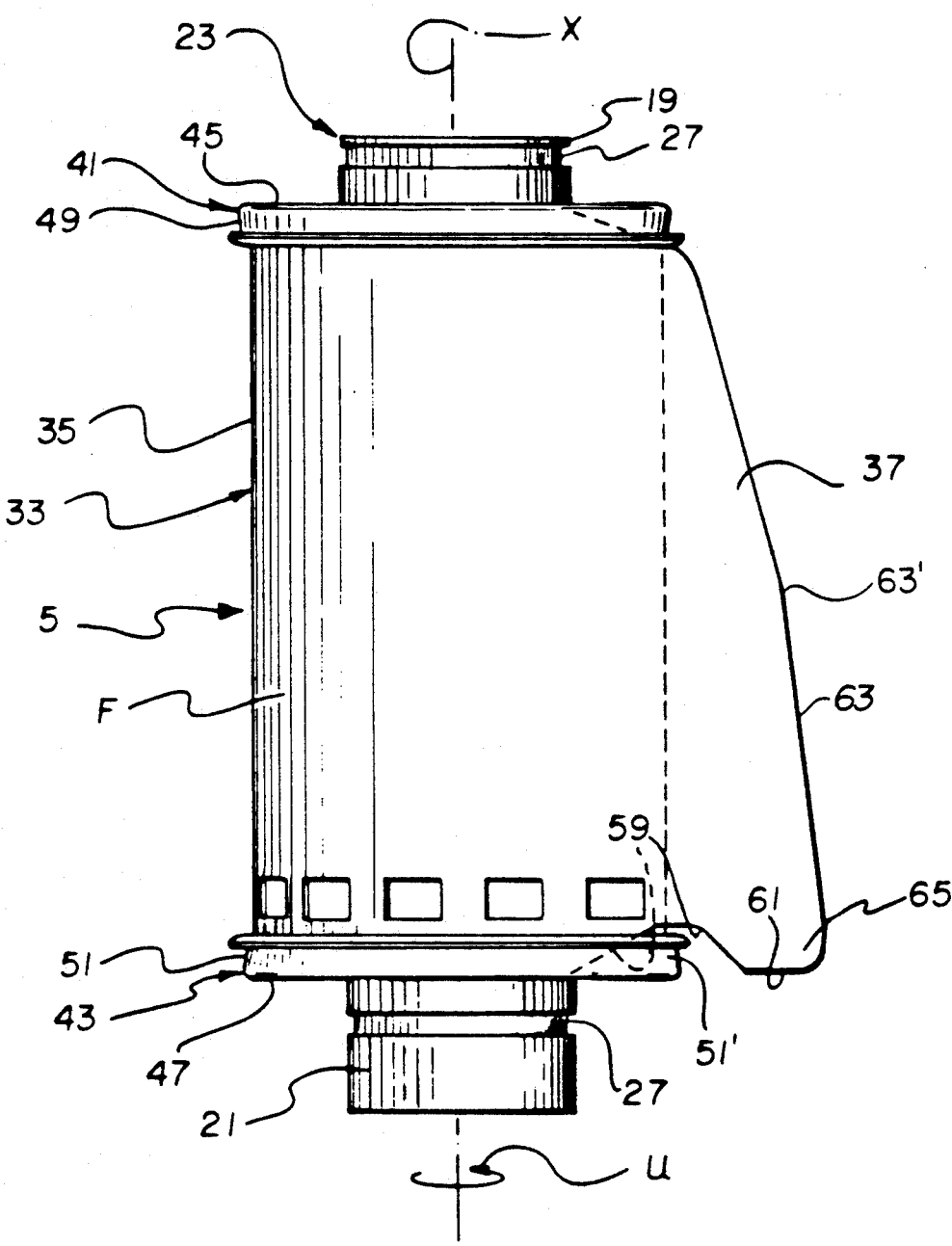
FIGS. 10 and 11 are elevation views similar to FIGS. 8 and 9, illustrating the manner in which the film roll is unwound from the film spool.

Once the leading edge 63 of the film leader (outermost convolution) 35 is substantially advanced over the stripper-guide 68 responsive to rotation of the spool core 23 in the unwinding direction U, the longitudinal edges 53 and 55 of the leader start to gently flex respective arcuate portions of the two flanges 41 and 43 away from one another, i.e. farther apart, first to allow the notch 59 to separate from the lip section 51', and then to allow successive longitudinal sections of the leader to uncoil from between the flanges and exit to the outside of the cassette shell 3. See FIGS. 10 and 11. The flexing of the flanges 41 and 43 occurs because the film width $W_F$ between the longitudinal film edges 53 and 55 is slightly greater than the axial spacing $A_S$ between the annular lips 49 and 51. Moreover, successive convolutions of the film roll 33 have a resistance to transverse bowing that is greater than the resistance of the flanges 41 and 43 to be flexed. Two pairs of flat curved bearing members 69 project from the interior walls 58 of the respective shell halves 7 and 9 to lie flatly against successive arcuate portions of the two disks 45 and 47 as the flanges 41 and 43 are flexed away from one another, to only allow those flange portions separated from the bearing members to be flexed farther apart. See FIGS. 1, 2 and 4. The bearing members 69 are positioned relatively remote from the film passageway 25. Thus, the leader 35 is only allowed to uncoil from between the flanges 41 and 43 relatively close to the passageway 25. See FIG. 7.

A film flattening rib 71 projects from the interior wall 58 of the cassette half 9 in the vicinity of the inner entrance to the film passageway 25 and the stripper-guide 68 to support successive longitudinal sections of the film leader 35 substantially flat widthwise as those sections are freed from the flanges 41 and 43, to facilitate movement of such sections into the passageway. See FIGS. 1 and 7. Two substantially parallel curved film supporting ribs 75 and 76 project from the interior wall 58 of the cassette half 7 to longitudinally extend from the film flattening rib 71 to part-way between the pair of bearing members 69 which project from the same wall. See FIGS. 1, 3, and 4. The film supporting ribs 75 and 76 longitudinally extend the entire location at which the film leader (outermost convolution) 35 can escape the confinement of the flanges 41 and 43, when the leader axially flexes the flanges away from one another. The film supporting ribs 75 and 76 as shown in FIG. 3 are positioned to be slightly spaced from the film leader 35, when the leader is confined within the annular lips 49 and 51. Another film supporting rib 77 projects from the interior wall 58 of the cassette half 7, opposite the stripper-guide 68. The other rib 77 is substantially parallel to and shorter than the first-two ribs 75 and 76. All three of the ribs 75–77 longitudinally extend perpendicular to and adjoin the flattening rib 71. See FIG. 1.

Operation

When the spool core 23 is initially rotated in the film unwinding direction U, the two flanges 41 and 43 momentarily tend to remain stationary and the film roll 33, since its inner end is attached to the spool core, will expand radially or clock-spring to force the film leader (outermost convolution) 35 firmly against the annular lips 49 and 51 of the flanges. Generally however, before the film roll 33 can be expanded radially to the extent a non-slipping relation would be created between the film leader (outermost convolution) 35 and the annular lips 49 and 51, the hook-like members 67 will have moved along the respective slots 66 (or from the flat areas 66' into the slots 66, and then) into engagement with the two flanges 41 and 43 to fix the flanges to the spool core. Then, further rotation of the spool core 23 will similarly rotate the flanges 41 and 43. As a result, the leading edge 63 of the film leader (outermost convolution) 35 will be substantially advanced over the shorter rib 77 and the stripper-guide 68, causing successive arcuate portions of the flanges 41 and 43 to be flexed away from one another as shown in FIG. 11. This first allows the notch 59 to separate from the lip section 51', and then it allows successive longitudinal sections of the film leader 35 to exit from between the flanges to the outside of the cassette shell 3.

If the spool core 23 is rotated in the film winding direction W after some length of the filmstrip F has been advanced from the cassette shell 3, the spool core is free to rotate relative to the two flanges 41 and 43 because the hook-like members 67 can move along the respective slots 66 out of engagement with the flanges. This permits the flanges 41 and 43 to be independently rotated in the winding direction W, though at a slower speed than the spool core 23 is rotated in that direction. Each of the hook-like members 67 may back out of one of the slots 66 and into the next slot during continued rotation of the spool core 23 in the winding direction W. At the same time, the filmstrip F will be rewound onto the spool core 23 between the flanges 41 and 43.

The invention has been described with reference to a preferred embodiment. However, it will be appreciated that variations and modifications can be effected within the ordinary skill in the art without departing from the scope of the invention.

I claim:

1. A film cassette comprising a spool supported for rotation in an unwinding direction inside a cassette shell, a filmstrip coiled about said spool to form a roll with an outermost film convolution that is a nonprotruding leader, and a stripper located substantially adjacent a passageway to the exterior of said shell for receipt between a leading edge of said leader and a next-inward film convolution of said roll to divert said leading edge into said passageway when said spool is rotated in the unwinding direction, is characterized in that:
    said leading edge of the leader is inclined at one angle rearwardly from its center point on a longitudinal centerline of said filmstrip towards one longitudinal edge of the filmstrip relatively remove from said stripper and is inclined at another angle, different than the first mentioned angle, forwardly from said centerpoint towards another longitudinal edge of the filmstrip relatively close to the stripper to facilitate movement of the leading edge into said passageway.

2. A film cassette as recited in claim 1, wherein said leading edge is inclined from said centerpoint towards said longitudinal edge relatively remote from said stripper at an angle that is greater than the angle at which the leading edge is inclined from the centerpoint towards said longitudinal edge relatively close to the stripper.

3. A film cassette as recited in claim 1, wherein said leading edge is inclined from said centerpoint towards said longitudinal edge relatively remote from said stripper at an angle that is at least twice as great as the angle at which the leading edge is inclined from the centerpoint towards said longitudinal edge relatively close to the stripper.

4. A film cassette as recited in claim 3, wherein the angle at which said leading edge is inclined from said centerpoint towards said longitudinal edge relatively remote from said stripper is substantially 15 degrees and the angle at which the leading edge is inclined from the centerpoint towards said longitudinal edge relatively close to the stripper is substantially 7 degrees.

* * * * *

UNITED STATES PATENT AND TRADEMARK OFFICE
CERTIFICATE OF CORRECTION

PATENT NO. : 5,251,840
DATED : October 12, 1993
INVENTOR(S) : J. J. Niedospial, Jr.

It is certified that error appears in the above-identified patent and that said Letters Patent is hereby corrected as shown below:

Col. 6, line 40 after "relatively" delete "remove" and insert --remote--

Signed and Sealed this

Fifth Day of July, 1994

Attest:

BRUCE LEHMAN

Attesting Officer     Commissioner of Patents and Trademarks